(12) United States Patent
Siddiqui et al.

(10) Patent No.: US 10,074,158 B2
(45) Date of Patent: Sep. 11, 2018

(54) SYSTEMS AND METHODS FOR STEREO DEPTH ESTIMATION USING GLOBAL MINIMIZATION AND DEPTH INTERPOLATION

(71) Applicant: QUALCOMM Incorporated, San Diego, CA (US)

(72) Inventors: Hasib Ahmed Siddiqui, San Diego, CA (US); Kalin Mitkov Atanassov, San Diego, CA (US); Stephen Michael Verrall, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 14/631,681

(22) Filed: Feb. 25, 2015

(65) Prior Publication Data

US 2016/0012567 A1 Jan. 14, 2016

Related U.S. Application Data

(60) Provisional application No. 62/022,127, filed on Jul. 8, 2014.

(51) Int. Cl.
*G06K 9/00* (2006.01)
*G06T 3/40* (2006.01)
(Continued)

(52) U.S. Cl.
CPC .......... *G06T 3/4053* (2013.01); *G06T 3/4007* (2013.01); *G06T 7/337* (2017.01);
(Continued)

(58) Field of Classification Search
None
See application file for complete search history.

(56) References Cited

U.S. PATENT DOCUMENTS 8,737,723 B1 * 5/2014 Kwatra ................ G06T 7/0075
345/419
2007/0024614 A1 2/2007 Tam et al.
(Continued)

FOREIGN PATENT DOCUMENTS

WO WO-2013100790 A1 7/2013

OTHER PUBLICATIONS

Chang C., et al., "Multiresolution Stereo by Simulated Annealing", Neural Networks, 1990 IJCNN International Joint Conference on, IEEE, Jun. 17, 1990, XP032295916, vol. 2, pp. 885-890.
(Continued)

*Primary Examiner* — Fred Hu
(74) *Attorney, Agent, or Firm* — Knobbe, Martens, Olson & Bear, LLP

(57) ABSTRACT

Aspects relate to a method of generating a high-resolution image containing depth information of an object. In one aspect, the method includes downsampling a first reference image and a second reference image from a first resolution to a second resolution, wherein the first resolution is higher than the second resolution, and wherein the first reference image and the second reference image comprising a stereo image pair. The method further includes generating a depth map at the second resolution based on global minimization techniques, using the downsampled stereo image pair. The method also includes upsampling the depth map from the second resolution to the first resolution and using a guided filter to align contours of the upsampled depth map to contours of the first reference image.

29 Claims, 11 Drawing Sheets

(51) Int. Cl.
*H04N 13/271* (2018.01)
*G06T 7/33* (2017.01)
*G06T 7/593* (2017.01)
*H04N 13/239* (2018.01)

(52) U.S. Cl.
CPC ........... *G06T 7/593* (2017.01); *H04N 13/239* (2018.05); *H04N 13/271* (2018.05); *G06T 2207/10012* (2013.01); *G06T 2207/10021* (2013.01); *G06T 2207/20016* (2013.01)

(56) References Cited

U.S. PATENT DOCUMENTS

| | | | |
|---|---|---|---|
| 2007/0071311 A1* | 3/2007 | Rovira-Mas | G06T 7/70 382/154 |
| 2013/0077852 A1* | 3/2013 | Chang | G06T 7/0075 382/154 |
| 2013/0106837 A1 | 5/2013 | Mukherjee et al. | |
| 2014/0169701 A1 | 6/2014 | Cui | |
| 2014/0198977 A1* | 7/2014 | Narasimha | G06T 5/007 382/154 |

OTHER PUBLICATIONS

International Search Report and Written Opinion—PCT/US2015/035846—ISA/EPO—dated Sep. 17, 2015.

\* cited by examiner

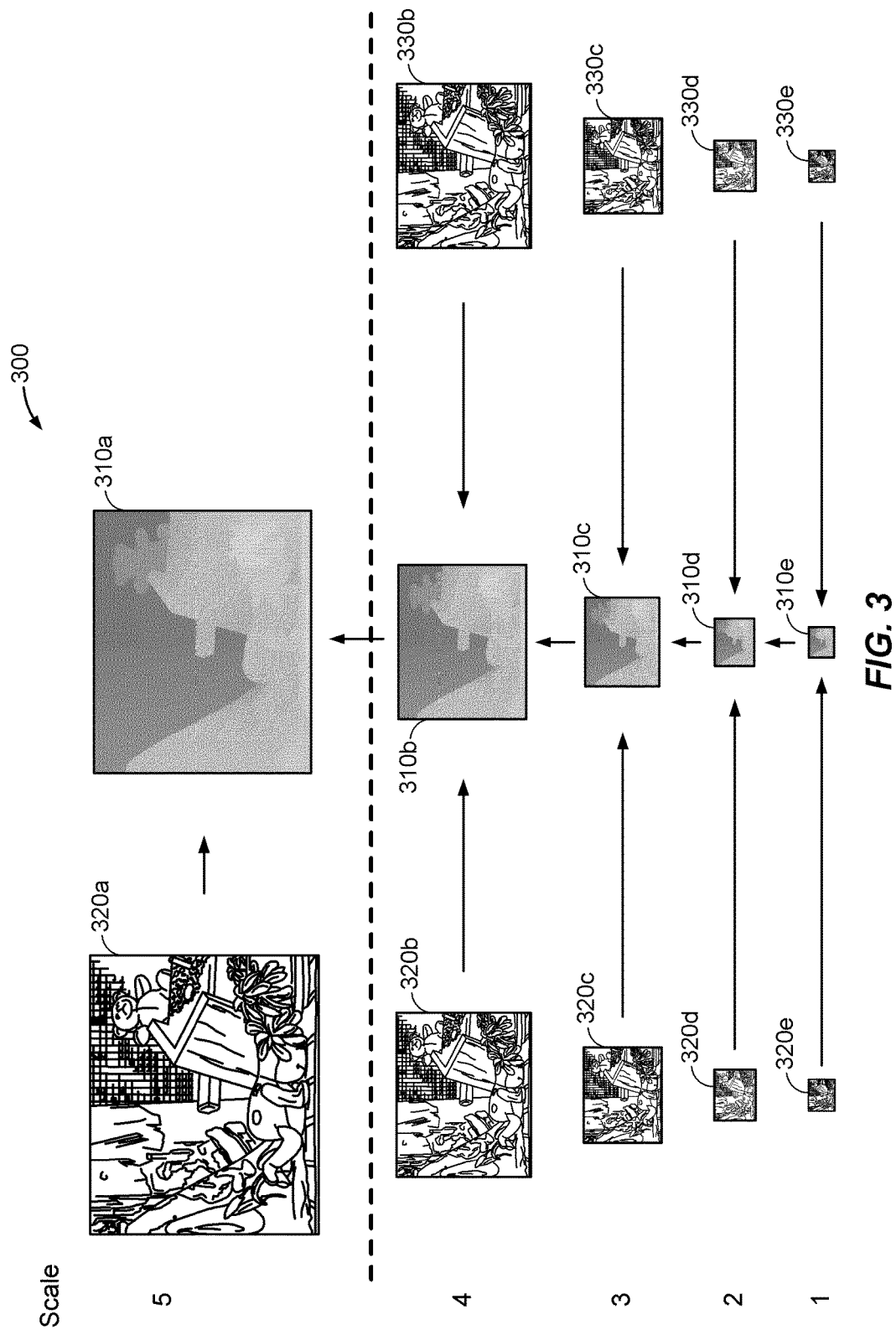

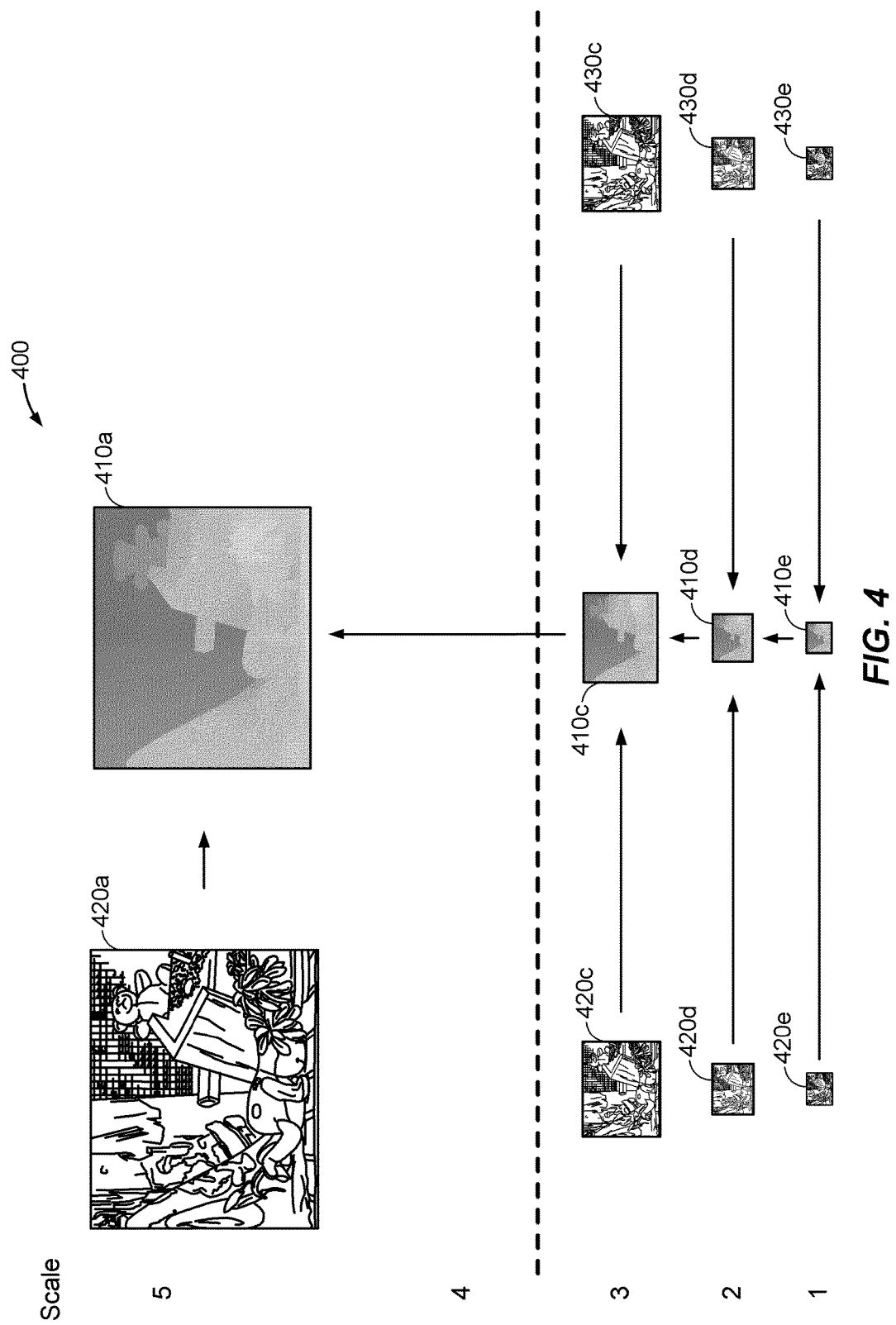

SYSTEMS AND METHODS FOR STEREO DEPTH ESTIMATION USING GLOBAL MINIMIZATION AND DEPTH INTERPOLATION

CROSS REFERENCE TO RELATED APPLICATIONS

The present application claims the benefit under 35 U.S.C. § 119(e) of U.S. Provisional Patent Application No. 62/022,127, filed Jul. 8, 2014, and titled "SYSTEMS AND METHODS FOR STEREO DEPTH ESTIMATION USING GLOBAL MINIMIZATION AND DEPTH INTERPOLATION," the contents of which is hereby incorporated by reference herein in its entirety.

BACKGROUND

Field

The present disclosure relates to efficient techniques for stereo depth estimation. In particular, the disclosure relates to systems and methods for stereo depth estimation using global minimization techniques and depth interpolation.

Description of the Related Art

Global minimization may be used to generate very high-quality depth (disparity) maps. However, these techniques may be very computationally intensive and may require a large amount of memory. In some aspects, it may be desirable to generate a high-resolution, accurate depth map using a method which requires less memory and computational run-time than these global minimization techniques.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One innovation includes a method of generating a high-resolution image containing depth information of an object. The method may include generating a reduced resolution first image from a reference first image, generating a reduced resolution second image from a reference second image, the reference first image and the reference second image being a stereo image pair, determining a set of conjugate pairs of points in the first and second reduced resolution images, generating a depth map, having the resolution of the first and second reduced resolution images, based at least in part on the conjugate pairs of points, upsampling the depth map to the resolution of the reference first image to generate a high resolution depth map, the upsampling including interpolating data in the depth map to generate depth data of the high resolution depth map, and modifying the depth data of the high resolution depth map to conform with edges of the reference first image or the reference second image.

One aspect of the present disclosure provides a method of generating a high-resolution image containing depth information of an object. The method includes downsampling a first reference image and a second reference image from a first resolution to a second resolution, wherein the first resolution is higher than the second resolution, and wherein the first reference image and the second reference image are a stereo image pair. The method further includes generating a depth map at the second resolution based on global minimization techniques using the downsampled stereo image pair and upsampling the depth map from the second resolution to the first resolution. The method also includes using a guided filter to align (or "snap") contours of the upsampled depth map to contours of the first reference image.

In one aspect, upsampling the depth map may include using bilinear interpolation to increase the resolution of the depth map from the second resolution to the first resolution. The second resolution may include, in one aspect, at most one-fourth as many pixels as the first resolution. For example, the second resolution may include one-fourth or one-sixteenth as many pixels as the first resolution. Generating a depth map at the second resolution based on global minimization techniques using the downsampled stereo image pair may include generating a depth map using an iterative process on progressively larger images to generate a depth map using global minimization. Generating a depth map at the second resolution based on global minimization techniques may include generating a depth map by minimizing an energy function based on global minimization techniques. The first reference image and the second reference image may be captured simultaneously by cameras which are a known distance from each other.

In one aspect, a device for generating a high-resolution image containing depth information of an object is disclosed. The device includes a processor configured to downsample a first reference image and a second reference image from a first resolution to a second resolution, wherein the first resolution is higher than the second resolution, and wherein the first reference image and the second reference image comprising a stereo image pair. The processor is further configured to generate a depth map at the second resolution based on global minimization techniques using the downsampled stereo image pair and to upsample the depth map from the second resolution to the first resolution. The processor is also configured to use a guided filter to align contours of the upsampled depth map to contours of the first reference image.

One aspect of the present disclosure provides a device for generating a high-resolution image containing depth information of an object. The device includes means for downsampling a first reference image and a second reference image from a first resolution to a second resolution, wherein the first resolution is higher than the second resolution, and wherein the first reference image and the second reference image comprising a stereo image pair. The device also includes means for generating a depth map at the second resolution based on global minimization techniques using the downsampled stereo image pair and means for upsampling the depth map from the second resolution to the first resolution. The device further includes means for using a guided filter to align contours of the upsampled depth map to contours of the first reference image.

In one aspect, a non-transitory computer-readable medium is disclosed. The medium includes code that, when executed, causes an apparatus to downsample a first reference image and a second reference image from a first resolution to a second resolution, wherein the first resolution is higher than the second resolution, and wherein the first reference image and the second reference image comprising a stereo image pair. The medium further includes code that causes an apparatus to generate a depth map at the second resolution based on global minimization techniques using the downsampled stereo image pair, upsample the depth map from the second resolution to the first resolution, and to use a guided filter to align contours of the upsampled depth map to contours of the first reference image.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

FIG. 3 illustrates an exemplary use of a method of using global minimization and interpolation to obtain a dense disparity (or depth) map.

FIG. 4 illustrates another exemplary use of a method of using global minimization and interpolation to obtain a dense disparity (or depth) map.

DETAILED DESCRIPTION

Figure 1:
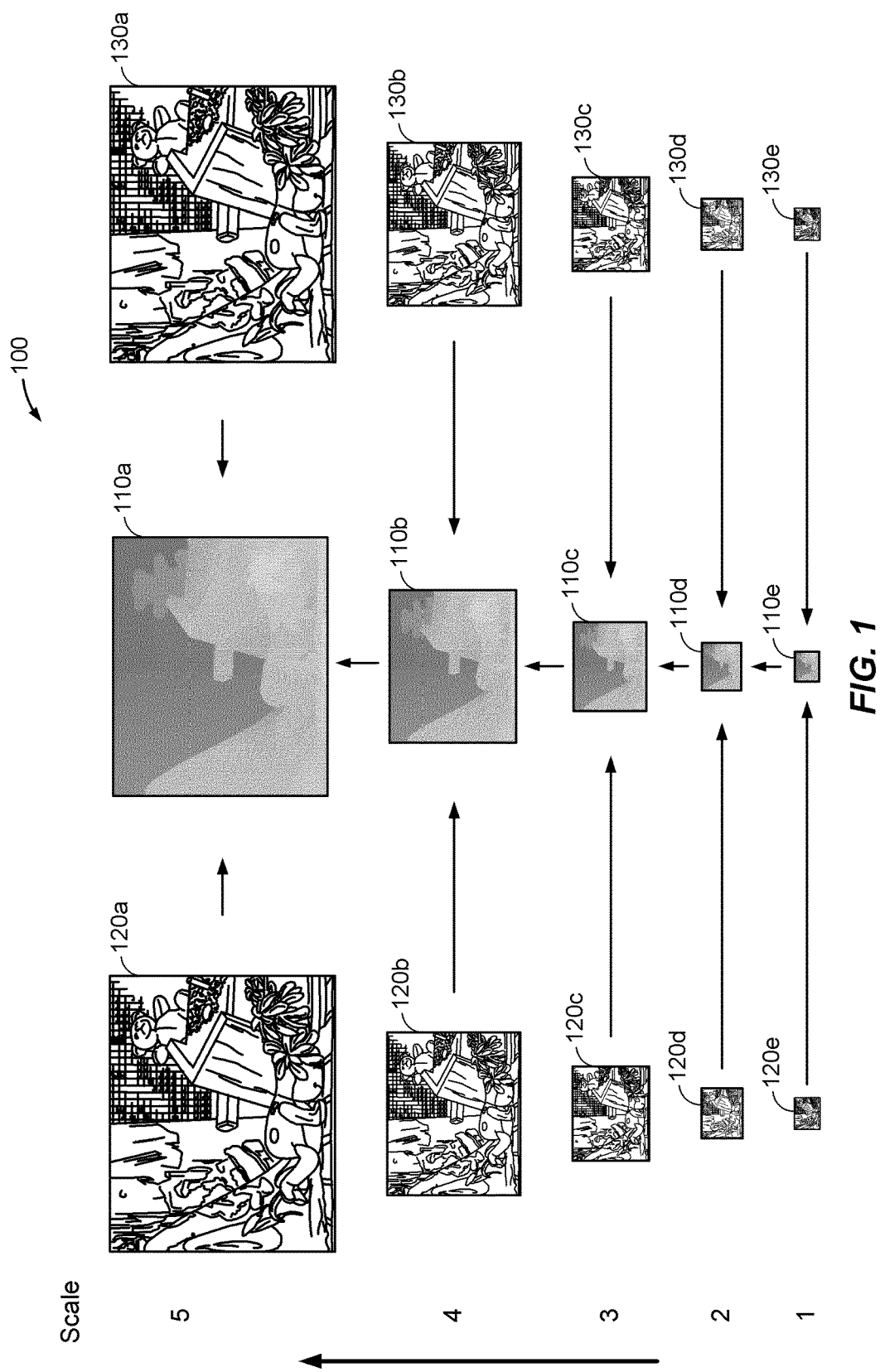
FIG. 1 illustrates an example of iterative steps which may be used by a global method to obtain a high-quality disparity map based on two stereo images.

In the following description, specific details are given to provide a thorough understanding of the examples. However, the examples may be practiced without these specific details, and the examples are not intended to limit the scope of the subject matter discussed herein.

A depth map (or disparity map) may generally refer to a three-dimensional computer graphics image or image channel which contains information relating to the distance of the surfaces of scene objects in the depth map from a particular viewpoint. For example, a depth map may have a resolution, like that of an ordinary true-color image, with a number of pixels in the x- and y-axes, arranged in a grid. Each of those pixels may have a value which represents the distance of the scene object at that location from the location of the viewer (or the camera capturing the image). For example, a depth map may use dark colors (such as black) to indicate that a particular point in an image is close to the camera relative to other points, and lighter colors (on a gradient to white) to indicate that other points in the image are further away from a camera relative to other dark-colored points. In some implementations, these colors may also be reversed such that near objects are lighter and distant objects are darker. These depth maps may be used for a number of different purposes. For example, a depth map may be used to add effects such as fog to a scene, to simulate a shallow depth of field in an image (such that distant objects are increasingly blurry), to help render scenes in three dimensions more efficiently, to create shadows in three-dimensional graphics, and other purposes.

A number of different techniques may be used to create depth maps. One technique for creating a depth map is stereo depth estimation. This technique involves capturing two images at the same time, or nearly so. Each image may be captured with a different imaging system (for example, two cameras). These two images may capture the same scene but from two different viewpoints such that objects in the scene are images from two different angles. For example, these images may correspond to "left eye" and "right eye" images of a scene, which are taken a small distance apart. Using the perspective of these two images, depth information may be determined. For example, objects which are at a far distance from two cameras used to capture the images may be in approximately the same position in the two images. In contrast, objects which are near the two cameras may be in much different locations in the two images. Based on the difference in position of various objects in a scene between the two images, depth information may be determined and a depth map may be created.

Stereo depth estimation may be used to determine three-dimensional models for depth map extraction. A number of different techniques may be used to create a depth map, when using stereo depth estimation. Each of these techniques may use two images of the same scene taken from slightly different angles in order to estimate distance to the objects in the images. For example, the images may be taken by two cameras placed a short distance from each other, the two cameras being configured to take photographs simultaneously. In some implementations, the two cameras may be placed on a mobile device such as a mobile phone, a tablet, or a digital camera and may be placed a known distance apart from each other. In some implementations, more than two cameras may be used. Based on these two or more images, a number of techniques may be used to generate a depth map, which indicates the depth (or distance from the camera) of the various objects in the images. Each technique that uses two or more images may be referred to as stereo depth estimation technique, based on the use of stereo images in determining the depth information.

There are a number of different techniques which may be used for stereo depth estimation. For example, "Advances in Computational Stereo" by Brown et al (Pattern Analysis and Machine Intelligence, IEEE Transactions on, 25(8), 993-

1008 (2003)) describes a number of different techniques which may be used for stereo depth estimation. Generally, these techniques may be grouped into two broad categories: local methods and global methods. These two categories of techniques work in different ways, and present different advantages and disadvantages.

Local methods of depth estimation typically identify individual "key" points of an image, in each of the two or more stereo images. For example, certain identifiable points (such as points that may be identifiable due to an edge or due to a color change in the images) may be defined as "key" points in each of the stereo images. These key points may be at slightly different positions in each image, because of the stereo nature of the images. Based on the varying positions of these key points in the two or more images, local methods of depth estimation determine a depth of the given key points. This results in a relatively sparse depth map—depths are known for only a limited number of key points spread across an image. The remainder of points may have their values interpolated based on the key points, and the color or other detail of the images may be used to propagate depth information from the key points to other areas of the image. Accordingly, in a local method, disparity computations may be made for every individual pixel alone, without taking into account each other pixel. This may result in a computationally less complex method, and may allow for efficient depth map calculation. Accordingly, this calculation may be done with relatively minimal amounts of memory and may be performed quite quickly. However, the trade-off for these low memory requirements is that the disparity map generated by such a technique may have low quality. Further, the quality of the disparity map may be severely impacted by noise and by errors in calibration of the stereo images.

Global methods of depth estimation ("global methods") instead generally operate by minimizing an energy function between two or more stereo images. Accordingly, such global methods work with the entire images at once rather than with discrete "key points" of an image as in local methods. This may be much more computationally complex that local methods for generating a depth map. For example, a global method may operate by attempting to minimize an energy function which includes a disparity smoothness element. in one example, an energy formula may include:

$$E(D)=E_P(D)+\mu E_S(D) \quad (1)$$

where E(D) is the energy to minimize, D is the disparity between the two or more stereo images, $E_P$ measures pixel similarity between the two images, and $E_S$ forces an amount of disparity smoothness based on a coefficient μ. Equation 1 may be used to calculate an energy disparity between two or more stereo images. After calculating this energy function, the value of D may be altered in order to minimize E(D). Generally, such an energy optimization may be performed using conjugate gradients, graph-cuts, and other techniques. These techniques may tend to increase execution time of the calculation and may have high memory requirements, compared to local methods for creating depth maps. However, unlike local methods for stereo-based depth estimation, these global methods may generate accurate and high-quality depth maps. Further, the depth maps generated using global methods may be much more robust to noise (in the stereo images) and to calibration errors. Accordingly, these depth maps may often be more accurate that local method-based depth maps.

Generally, global methods may operate by processing images having a coarser (or low) resolution first and then iteratively process images having a fine (or high) resolution. For example, FIG. 1 illustrates an example of iterative processing that may be used by a global method to obtain a high-quality disparity map 110a. First, a right image 120a and a left image 130a may be captured simultaneously by two cameras. These images may capture the same scene at the same time, from slightly different angles. Each of these images may be a high-resolution image.

Rather than generating the disparity map 110a in a single step based on the high resolution images 120a, 130a, an iterative process may be used. For example, the right image 120a may be downsampled to a number of smaller right images 120b, 120c, 120d, 120e. For example, each of the downsampled images may have ¼ of the pixels of the larger image above it. For example, if image 120a is 1024×1024 pixels, image 120b may be 512×512 pixels, image 120c may be 256×256 pixels, and so on. Downsampling may also be done such that each image is proportionally smaller (for example, by a certain multiple) than the image it is generated from, or from the original image. In some embodiments, the proportion reduction may vary from image-to-image (for example, such that one image may be one quarter (¼) the size of another, which another image is one-half (½) the size of another). Similarly, the left image 130a may be downsampled to a number of smaller left images 130b, 130c, 130d, 130e. The left images and the right images may be downsampled in the same manner, such that there is a matching pair of images at the same resolution for each downsampled size. As indicated by the arrows in illustration 100, the smallest pair of downsampled images may initially be used to form the smallest disparity map 110e. This disparity map 110e may be formed using an equation like that found in Equation 1, by minimizing an energy function. In some implementations, the smaller images (left images 130b, 130c, 130d, 130e and/or right images 120b, 120c, 120d, 120e) may be generated from the respective parent images 130a, 120a. In other embodiments the smaller images (left images 130b, 130c, 130d, 130e and/or right images 120b, 120c, 120d, 120e) may be generated from the previously generated image (for example, image 120b is generated from 120a, image 120c is generated from image 120b).

After the smallest disparity map 110e has been created, each further disparity map, such as disparity map 110d, may be created using larger versions of the left image 130d and the right image 120d, along with the previously-generated smaller disparity map 110e. Accordingly, as shown in illustration 100, a number of different, progressively larger disparity maps may be generated. In illustration 100, five different sizes of disparity map are illustrated, with each disparity map containing a higher resolution, and thus more detail, that the previous disparity maps.

Local methods and global methods may offer different advantages and disadvantages. Accordingly, in some aspects, it may be desired to use a method which offers high-quality performance similar to that found using a global method, but which is much faster and computationally less intensive. For example, one efficient approach for stereo depth estimation may use global minimization techniques at coarse (low) resolutions, and then may perform a fast interpolation of the coarse disparity map to obtain a high-resolution disparity map. This may result in a depth map that has a high peak signal-to-noise ratio (PSNR), but which can be generated using significantly less computation than using a global minimization technique.

For example, as illustrated in illustration 100, a global estimation method for generating a disparity map may include a number of different levels, corresponding to different resolutions from coarse to fine (low-resolution to high-resolution). Generally, for each step of the global estimation method, the computing time/resources used for each step may be proportional to the number of pixels in the disparity map that is being generated. For example, if each step of the global estimation method doubles the length and width of the disparity map from the previous step (e.g., moving from 320×240 to 640×480), each step will have four times as many pixels as the previous step. Thus, each step may take approximately four times as long as the previous step. Accordingly, when using the method in illustration 100, approximately 75% of the execution time of the method may be used on the final step, to generate the high-resolution disparity map 110a based on disparity map 110b, left image 130a, and right image 120a. Further, approximately 20% of the execution time of the method may be used to generate disparity map 110b, the second-last disparity map. Thus, approximately 95% of the execution time of the method in illustration 100 is spent generating disparity maps 110a and 110b. Accordingly, if the process was stopped after creating disparity map 110c, this may reduce the run-time of the process by approximately 95%.

As shown, a large proportion of the execution time of a global estimation method may be used to convert a coarse resolution disparity map (e.g., disparity map 110c) into a high resolution disparity map 110a. Accordingly, run-time to generate a high-resolution disparity map may be significantly reduced by using efficient interpolation to convert a relatively coarse disparity map into a high-resolution disparity map. This is true because such a large proportion of the run-time in illustration 100 is used converting disparity map 110c into disparity map 110a, and because it may be significantly less computationally difficult to use interpolation instead of the global minimization to upsize the coarse disparity map.

Figure 2:
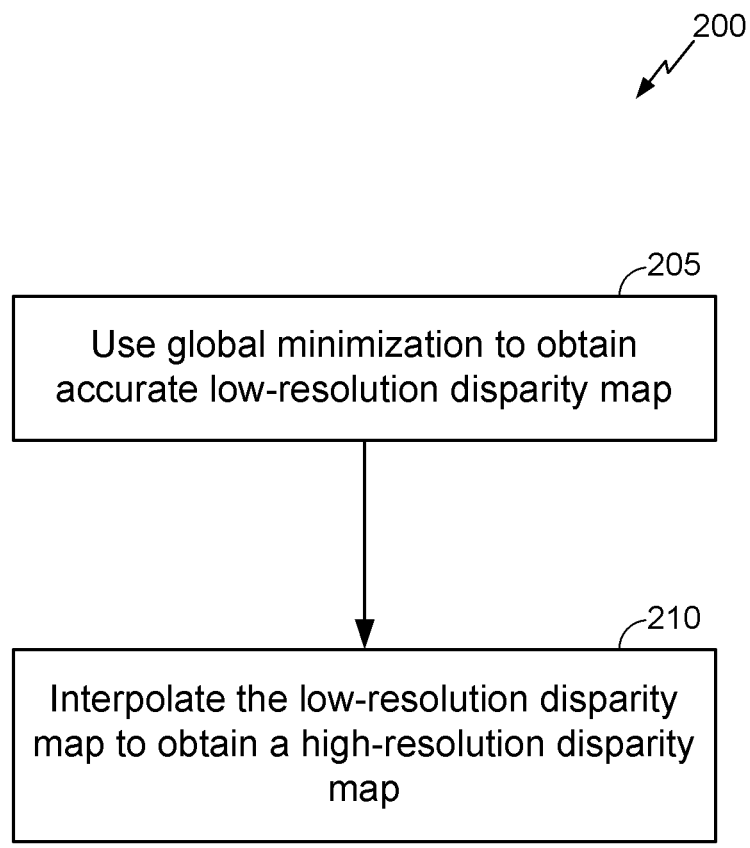
FIG. 2 illustrates an example of a process for generating a high-resolution disparity map using a global minimization technique and using interpolation.

FIG. 2 is a method 200 for generating a high-resolution disparity map using interpolation. This method 200 may be used by, for example, a mobile phone, a digital camera, or another digital imaging device.

At block 205, the method uses global minimization to obtain an accurate disparity map at low resolution. For example, global minimization techniques may include using an error-minimizing equation such as Equation 1. These equations may be used recursively, as in illustration 100, in order to generate progressively higher-resolution disparity maps. However, unlike in illustration 100, here, the global minimization technique may be used only to generate a low-resolution disparity map, such as stopping the technique after generating depth map 110b or 110c. For example, the disparity map generated by global minimization may be one half the size of the desired disparity map. In some aspects, the disparity map may also be another size relative to a desired high-resolution disparity map, such as one-quarter the size, one-eighth the size, or another size. In some aspects, the means for using global minimization may include a processor.

Generally, in a low-resolution disparity map, the disparity values for foreground objects may be quite accurate. These objects may take up a larger portion of the images than smaller background elements, and may have a larger depth difference between the objects than background elements. Accordingly, using a low-resolution disparity map may result in some lost depth accuracy and resolution for distant objects, but may still be accurate for foreground objects. This disparity map may also be robust to noise and calibration errors, unlike a display map generated using the local methods described above. Further, the execution time and memory requirements needed to generate the low-resolution disparity map are much lower than those needed to generate a high-resolution disparity map using global techniques.

At block 210, the method performs high-quality interpolation of the low-resolution disparity map to obtain a high-resolution disparity map. For example, the low-resolution disparity map may be upsized, such as by using normal techniques to increase the size of an image (or a depth map) by 200%, 400%, or another size in order to achieve the desired size. In some aspects, the desired size may be based, at least in part, on a size of the input images (the original high-quality stereo image pair) to the method. For example, global minimization techniques may operate by taking two or more input images (e.g. a left input image and a right input image) and generating a disparity map based on those images. Accordingly, the desired resolution of the high-resolution disparity map may be based on the resolution of the source images. For example, the desired resolution of the disparity map may be equal to the resolutions of the original pair of stereo images.

In some aspects, the low-resolution disparity map may be upsampled to a high-resolution using linear interpolation. This method may accurately estimate the piecewise constant disparity inside objects. However, object contours in the upsampled disparity map may be blurred and aliased due to the upsampling. However, a high-resolution reference image (such as one or more of the original pair of stereo images) may be used to restore the edges of the disparity map. For example, the reference image may be high-resolution and may contain sharp edges. These sharp edges (transitions between colors of various objects in the image) may be used to sharpen the blurred edges of the upsampled disparity map. Accordingly, this method may be used to create a high-resolution disparity map which is crisp, has a high PSNR, and which is accurate for foreground objects.

A disparity map generated by this method may have a number of different uses. For example, the disparity map may be used for 3D rendering of the foreground of the image. This may assist in, for example, slightly altering the perspective of the image itself. The disparity map may also be used to alter the Bokeh effect of an image (that is, to alter how out-of-focus background objects are based on their distance from the image, which simulates taking a photograph using a different lens, such as a lens with a different f-number).

FIG. 3 illustrates an example of a method of using interpolation to obtain a dense disparity (or depth) map. In some embodiments, the method in illustration 300 may be the same as the method in illustration 100 (FIG. 1) up to the point where disparity map 310b is generated. However, in illustration 100, the final disparity map 110e may be generated using another iteration of the global minimization technique. In contrast, in illustration 300, disparity map 310b may be upsampled to the size of disparity map 310a. For example, disparity map 310b may represent a relatively coarse disparity map, which may only have, for example one-quarter the number of pixels found in disparity map 310a and in right view 320a. For example, the coarse disparity map 310b may have half the number of pixels of right view 320a, in each of the x- and y-axes. This upsampling may be done as described above, using linear interpolation, in some examples.

As part of this upsampling, edges of the upsampled image may be sharpened. For example, right view 320a may be used to sharpen the upsample disparity map, forming high-resolution disparity map 310a. As indicated in illustration 300, this method of generating a disparity map, in which the global optimization/minimization technique is stopped after level 4 and an interpolation is used to get to the $5^{th}$ scale level, may reduce run-time to approximately one-quarter of the run-time of the global minimization technique, while still resulting in a high-quality, high-resolution depth map. For example, in this example, the signal-to-noise ratio of the final depth map may be 42.4 dB, while run-time of the method is approximately ¼ as long.

FIG. 4 is another exemplary use of a method of using interpolation to obtain a dense disparity (or depth) map. In this illustration 400, global optimization/minimization may be used in a manner similar to that in illustration 100. However, here, after the third level disparity map 410c is generated, the disparity map 410c may be upsampled to the final size. In some aspects, disparity map 410c may have one-quarter the number of pixels in each of the x- and y-axes, compared to right view 420a. Accordingly, disparity map 410c may have one-sixteenth the number of pixels of right view 420a.

This upsampled disparity map may then be sharpened by right view 420a, in order to increase the sharpness of the edges in the upsampled image. Accordingly, illustration 400 shows a method similar to that illustrated in illustration 300 (FIG. 3), except one fewer iteration of the global minimization technique is used prior to upsampling. For example, this method may use interpolation after the $3^{rd}$ scale level, in order to interpolate up to the fifth scale level. Because approximately $15/16$ths of the execution time of the global method may be used on the final two iterations of the global method, the hybrid method of illustration 400 (FIG. 4) may reduce run-time to approximately $1/16^{th}$ of the run-time of the global method illustrated in illustration 100. The PSNR of the disparity map generated in illustration 400 is 40.7 dB. It may be observed that the PSNR of disparity map 410a is lower than that of disparity map 310a. This illustrates one of the trade-offs that may be made in choosing how many iterations of the global minimization method to use. Using a larger number of iterations may increase the quality of the high-resolution disparity map, however, it may also significantly increase the run-time and memory requirements of the corresponding calculations.

Generally, the techniques used herein to generate a high-resolution disparity map may be much more effective in generating an accurate disparity map than they would be in re-creating an accurate true-color image. This is because natural/true color images may be thought of as containing two distinct components: a band-limited component and a high-pass component. First, an image contains a band-limited component, which comprises object hues and sharp edges. For example, this band-limited component may contain information regarding the edges of particular objects, as those objects may create very sharp color and other discontinuities in an image. Second, an image contains a high-pass component which includes fine details, oscillating patterns, and noise. High-pass components include a number of different details which make for small variations from pixel-to-pixel. For example, the textures of various objects may be contained within this high-pass component. In contrast, depth maps do not contain the same amount of high-pass components. For example, the depth of various objects in a scene usually only change gradually and smoothly, whereas the colors of objects may have many irregular differences, reflecting information such as a pattern or shadows.

Figure 5A:
FIG. 5A depicts an example of a true color image containing a number of objects.
Figure 5B:
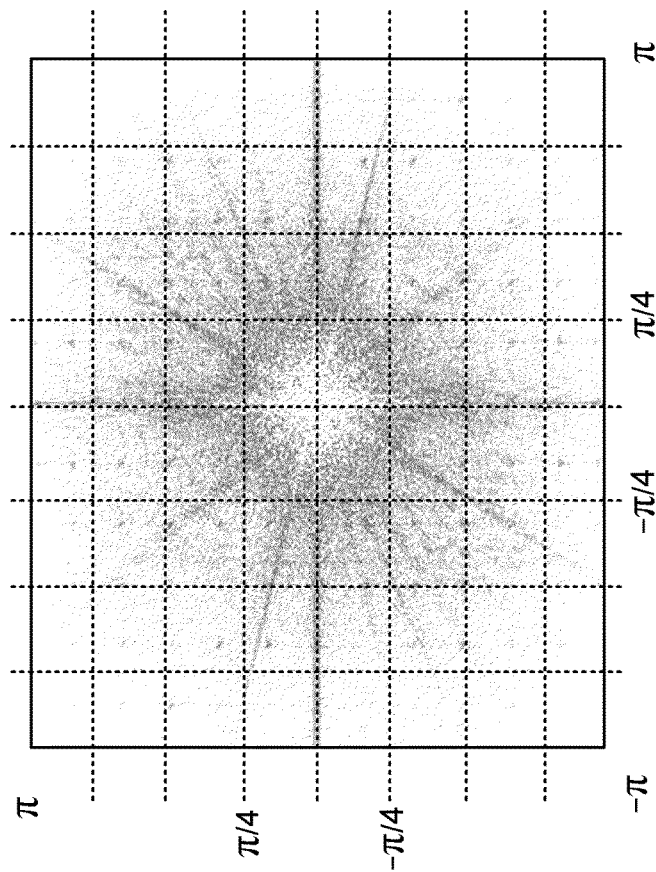
FIG. 5B illustrates various component bands found in an image, generated by taking a Fourier transform of the image.

FIG. 5A illustrates a representation of a true color image containing a number of objects. FIG. 5B shows an illustration 550 of the various component bands found in image 500, generated by taking a Fourier transform of image 500 with wide support, from $-\pi$ to $+\pi$. As shown by illustration 550, image 500 contains a large number of different bandwidths, extended well outward from the center of the image at [0, 0]. Generally, band-limited components of an image are near the center of the image at [0, 0], while high-pass components may be defined as components that are more distant from the center of the image at [0, 0]. Accordingly, as illustrated here, true color images contain a relatively large amount of high-pass components.

Figure 6B:
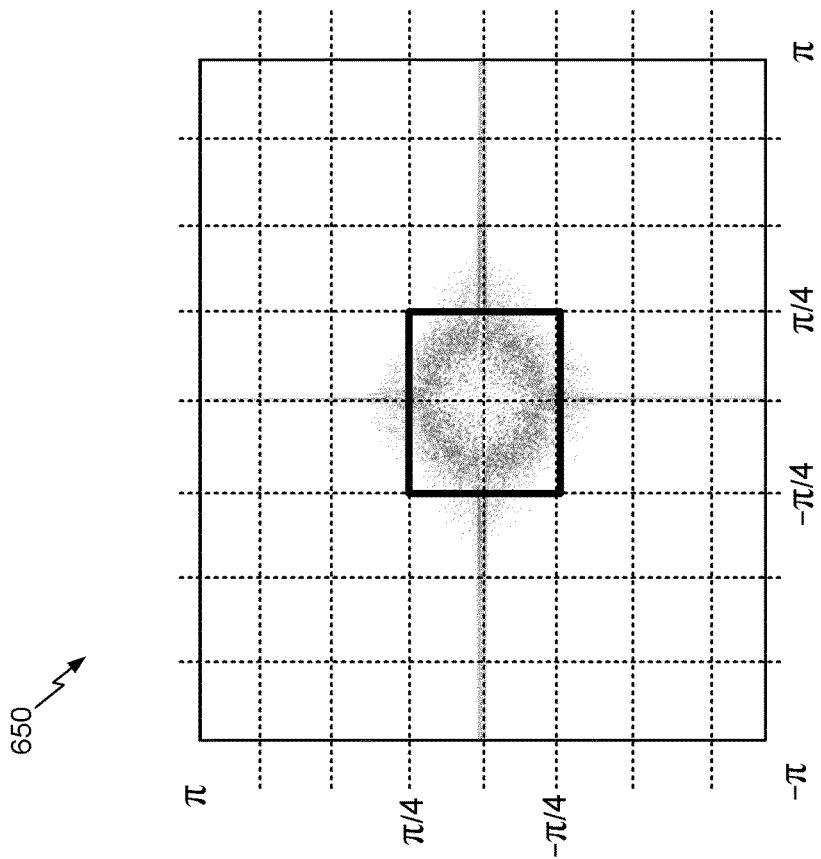
FIG. 6B illustrates various component bands found in an upsampled image, generated by taking a Fourier transform of the upsampled image.
Figure 6A:
FIG. 6A depicts an example of a true color image containing a number of objects, the image generated using upsampling.

FIG. 6A illustrates a representation of a true color image 600 containing a number of objects, and was generated in a manner similar to certain methods contained in this disclosure. For example, image 600 may correspond to image 500, except that image 600 has been downscaled, and then upsampled to 4× using linear interpretation. FIG. 6B is an illustration 650 of the various component bounds found in image 600, generated by taking a Fourier transform of image 600. As shown in illustration 650, image frequencies outside the range of $[-\pi/4, \pi/4]$ are lost due to the upsampling. Because image 600 and image 500 are identical except for the upsampling, the differences between illustration 550 and illustration 650 are solely due to the effects of this upsampling.

As shown in image 600, these lost frequencies contain a larger amount of information about, for example, the texture of various objects. Because this information is contained in higher frequency bands (higher in absolute value—outside the $[-\pi/4, \pi/4]$ range) not found in the upsampled image, that information has been lost and is not contained in the upsampled image. As indicated next to image 600, this image contains a PSNR of 25.04 dB, which is very low compared to the previously-illustrated disparity maps. Accordingly, it may be observed based on the differences in the component bands and the low PSNR that image 600 lost a significant amount of information compared to image 500.

Figure 7B:
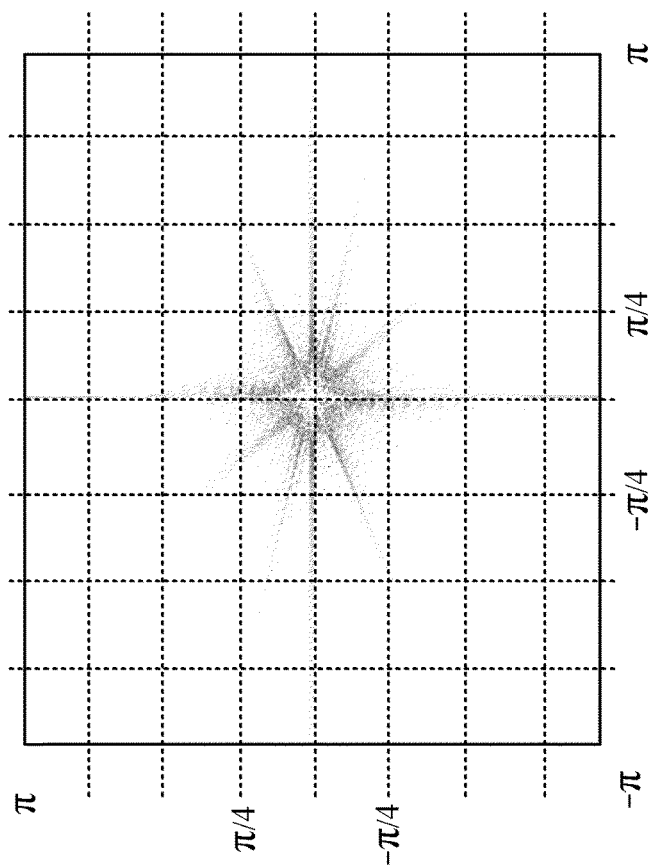
FIG. 7B illustrates an example of a Fourier transform of a disparity map generated using a global minimization method.
Figure 7A:
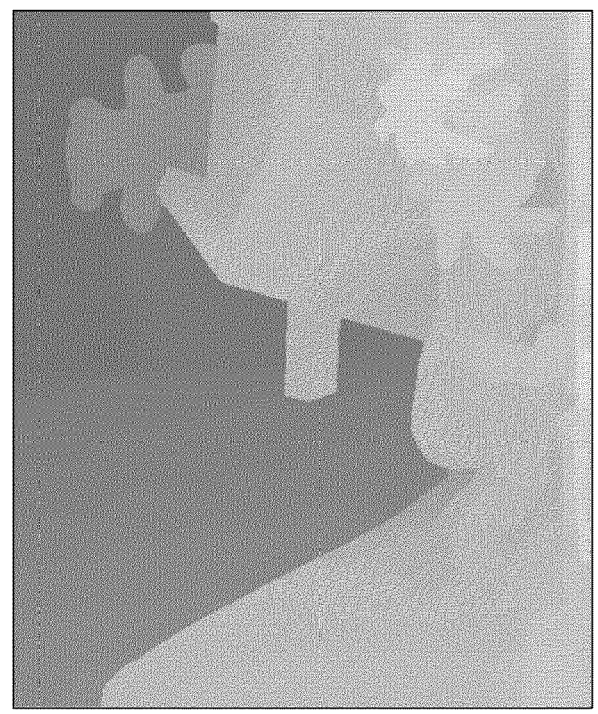
FIG. 7A illustrates an example of a disparity map generated using a global minimization method based on a received stereo image pair.

FIG. 7A illustrates an example of a depiction of a disparity map 700 generated using a global minimization method. The disparity map 700 was created by using the global minimization method to create the entire image, without any interpolation. For example, this disparity map 700 may have been created using a process as illustrated in FIG. 1. FIG. 7B is an example of an illustration 750 of a Fourier Transform of disparity map 700. It may be noted that illustration 750, unlike illustration 550, contains very little information outside of a $[-c\pi, c\pi]$ range, where c is a small value. This lack of information may relate to a difference between true-color images and disparity maps. True-color images contain a large amount of, for example, object textures and other information which may vary the color of a particular area on a pixel-to-pixel basis. In contrast, disparity maps contain much less pixel-to-pixel variation in depth. Instead, a disparity map may instead primarily have sharp changes, relating to the edge of objects, and gradual gradients relating to variations in distance on different points on a shape (for example, the shape of a stuffed animal). Thus, as illustrated, a disparity map may be piece-wise constant, and mostly consists of only a band-limited component comprising object silhouettes and sharp edges. Due to the band-limited nature of a disparity map, a disparity map that has been recreated through upsampling, unlike a true-color image created through upsampling, may much more faithfully recreate the full-size version, without losing as much information.

Figure 8B:
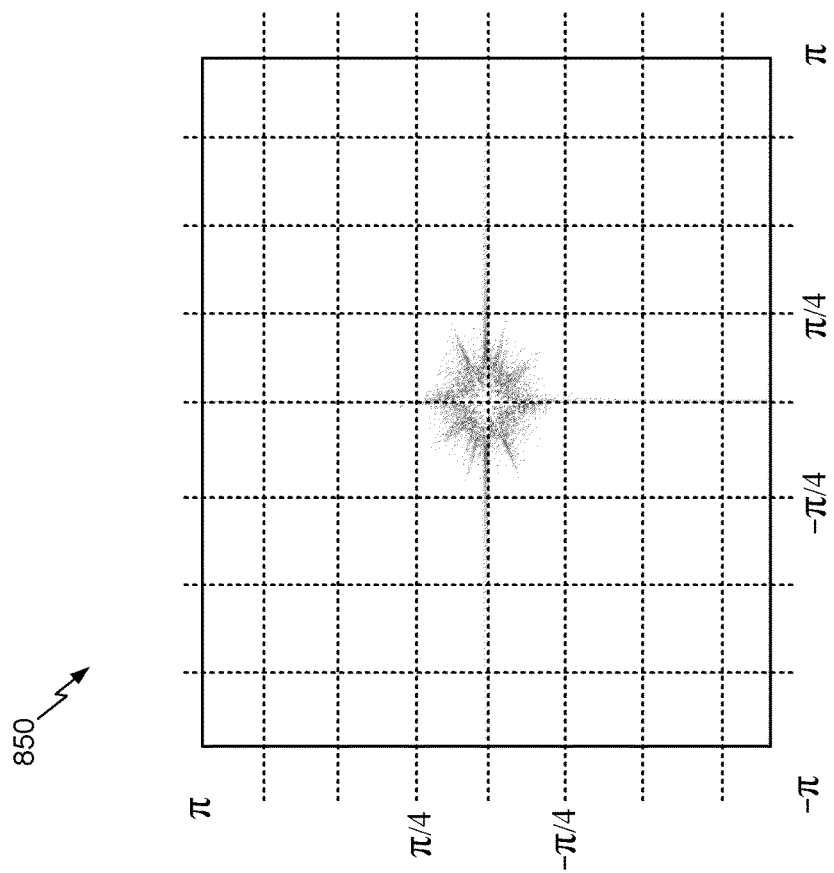
FIG. 8B illustrates an example of a Fourier transform of an upsampled disparity map.
Figure 8A:
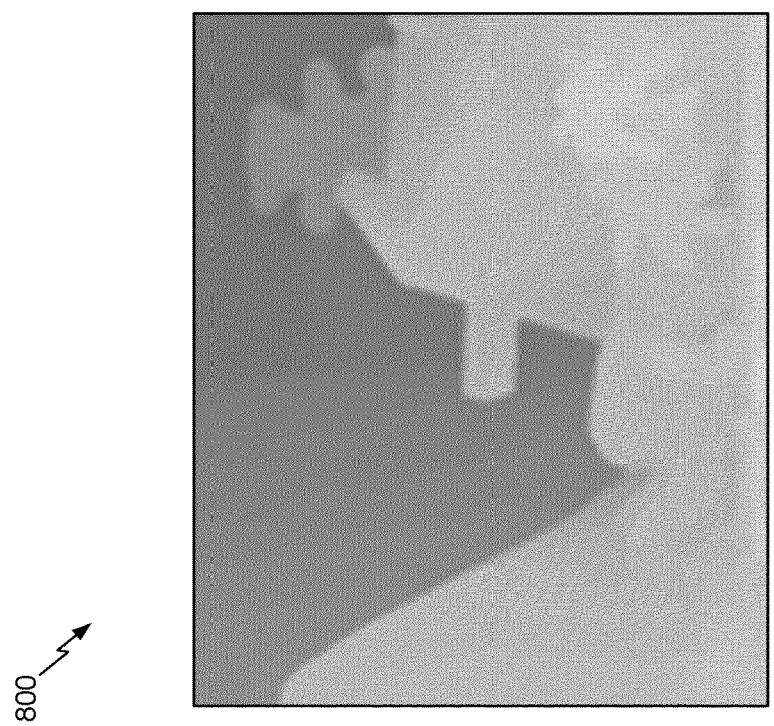
FIG. 8A illustrates an example of a disparity map that has been produced through upsampling a smaller disparity map.

FIG. 8A is an illustration of a disparity map 800 that has been produced through linear interpolation, but without the use of edge sharpening. Linear interpolation may be one method of upsampling an image such as a disparity map. For example, this disparity map 800 has been produced by upsampling a low-resolution depth map by 4× in each direction, such as from 160×120 to 640×480. Because this disparity map 800 has been upsampled, it may be observed that the edges between various objects in the disparity map 800 are blurry. FIG. 8B is an illustration 850 of a Fourier Transform of the disparity map 800 produced through linear interpolation. As in illustration 650, the upsampled nature of disparity map 800 (which was produced through linear interpolation at 4×) means that the resulting illustration shows a band-limited spectrum from $[-\pi/4, \pi/4]$. However, because a disparity map does not have the level of fine pixel-to-pixel detail that a natural color image may have, it may be observed that much less information has been lost from the disparity map due to upsampling from a smaller version (compared to generating the larger version through continued use of a global minimization method) than is observed in an upsampled true color image. This may be observed by noting that the difference between illustration 750 and illustration 850 is much smaller than the difference between illustration 550 and illustration 650. Further, it may be observed that the PSNR of image 800 is 39.07 dB, compared to only 25.04 dB in image 600. Thus, disparity map 800 may represent a much better re-creation of disparity map 700 than may be observed using the same technique in true-color images.

Figure 9B:
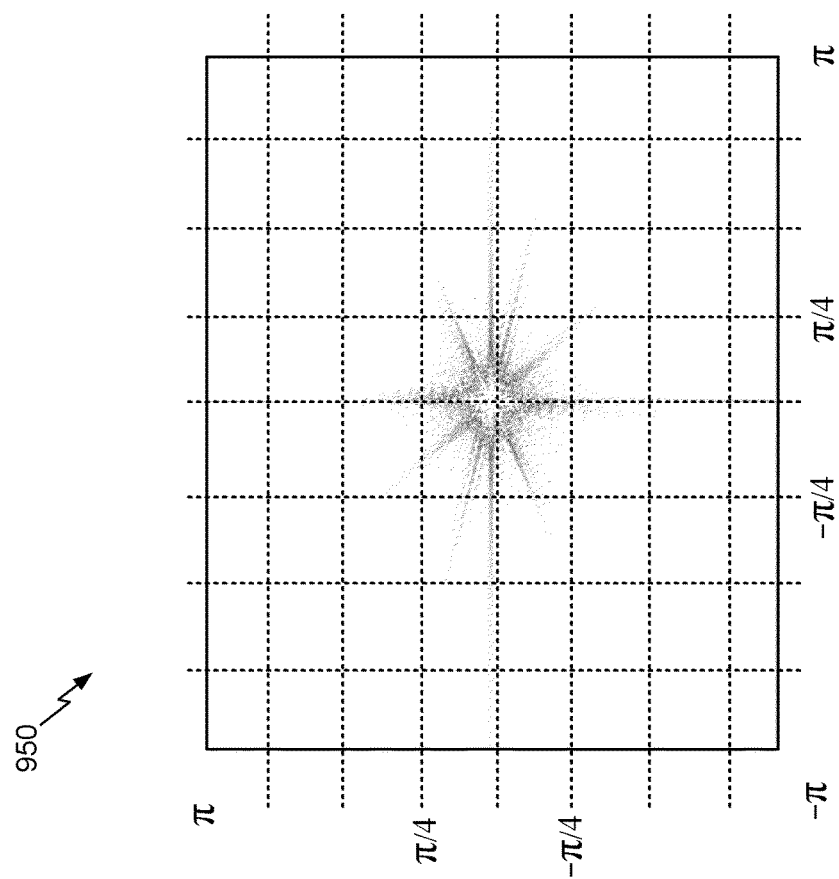
FIG. 9B illustrates an example of a Fourier transform of the disparity map which has been produced by upsampling a smaller disparity map and using guided filtering to sharpen the edges based upon a reference image.
Figure 9A:
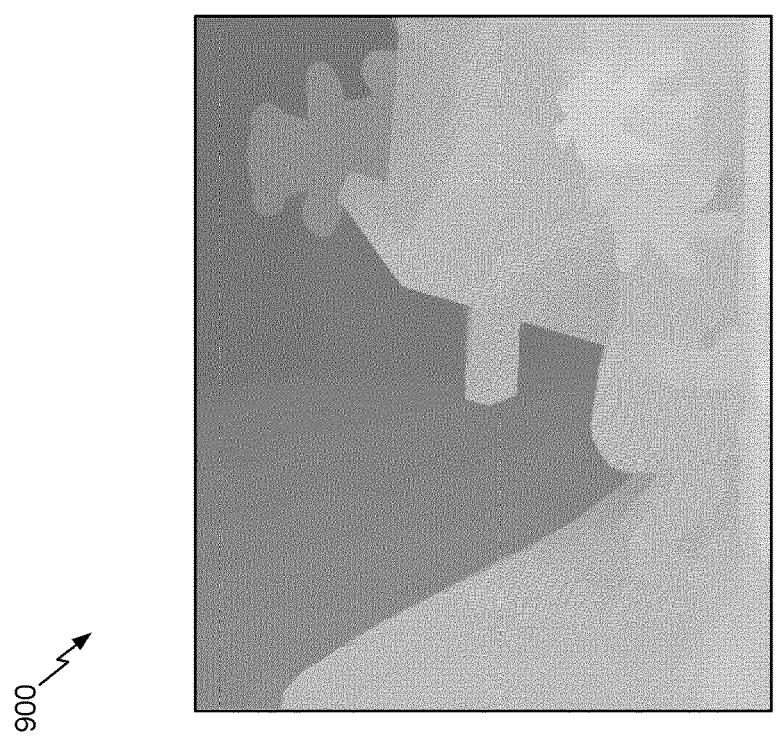
FIG. 9A illustrates an example of a disparity map which has been produced by upsampling a smaller disparity map and using guided filtering to sharpen the edges based upon a reference image.

An interpolated disparity map, such as disparity map 800, may be further improved by using a high-resolution image to sharpen the edges of the disparity map. FIG. 9A is an illustration of a disparity map 900 which has been produced by upsampling a smaller disparity map and using guided filtering to sharpen the edges based upon a high-resolution image. FIG. 9B is an illustration 950 of a Fourier Transform of the disparity map 900 produced through linear interpolation. As shown, illustration 950 is very similar to illustration 750. For example, disparity map 900 has a PSNR of 40.70 dB, which means that this disparity map is an accurate re-creation of disparity map 700. However, disparity map 900 may require only approximately $\frac{1}{16}^{th}$ the time to generate as the time needed to generate disparity map 700. Accordingly, it may be observed that the methods discussed herein may significantly reduce the time, memory, and computational power needed to generate a disparity map, while still maintaining high resolution and accuracy.

Figure 10:
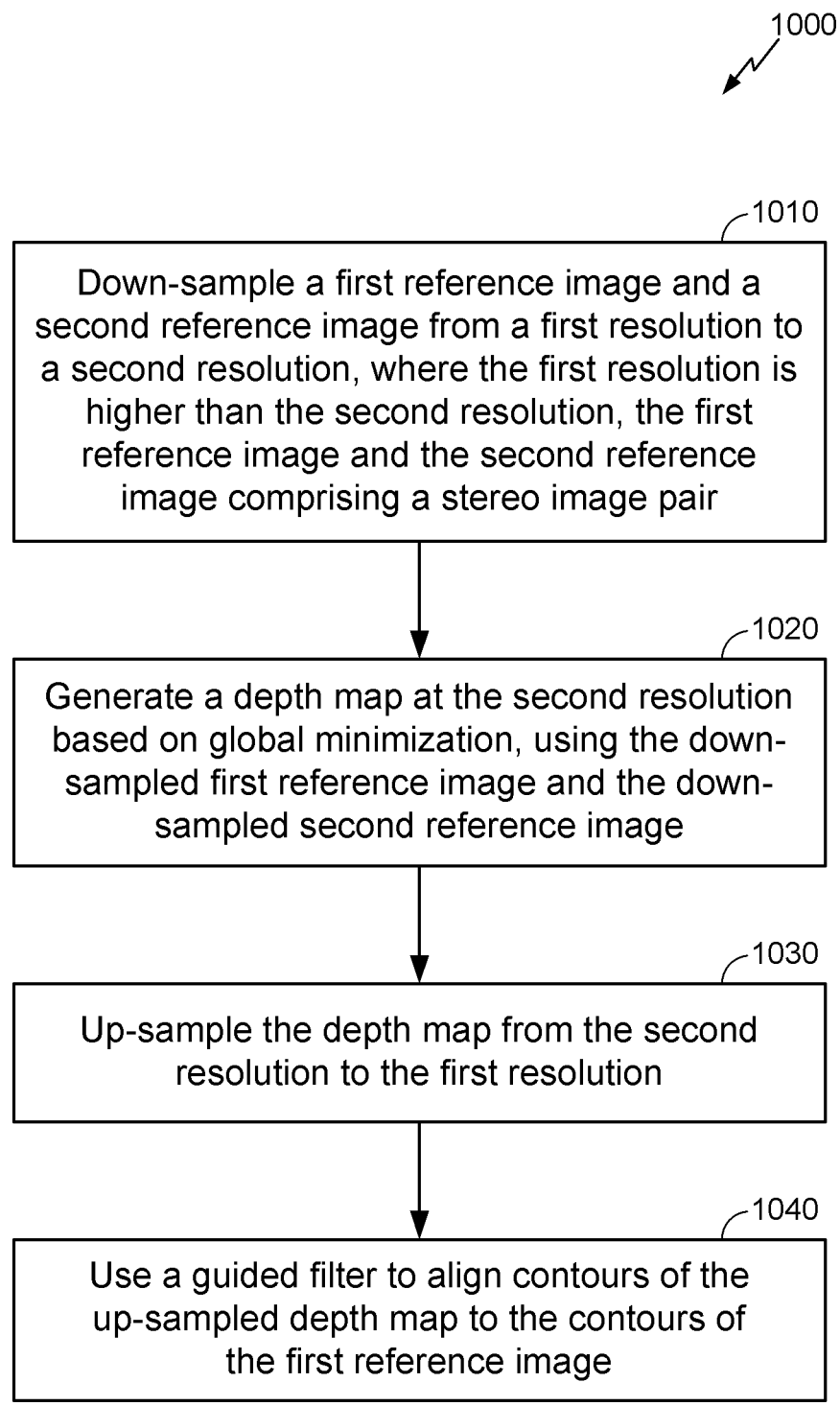
FIG. 10 illustrates an exemplary method for generating a high-resolution depth map according to some aspects of the present disclosure.

FIG. 10 illustrates an exemplary method 1000 for generating a high-resolution depth map according to some aspects of the present disclosure. This method 1000 may be carried out on a device with digital imaging capabilities, such as a mobile phone or a digital camera.

At block 1010, the method includes downsampling a first reference image and a second reference image from a first resolution to a second resolution, where the first resolution is higher than the second resolution, the first image and the second image comprising a stereo image pair. For example, the method may receive a first reference image and a second reference image from two digital image capture devices, such as two digital cameras built into a single device. These images may be captured simultaneously, and may show the same scene but from slightly different angles. Accordingly, these images may be referred to as a stereo image pair, because together these two images may allow a three-dimensional view of a given scene, in a manner similar to how two eyes may be used to provide three-dimensional information such as depth information. In some aspects, the reference images may be received at a high resolution, and may be downsampled to a resolution which is, for example, one-quarter or one-sixteenth the number of pixels of the original resolution. Thus, the second resolution may contain less than one-fourth as many pixels as the first resolution. For example, the second resolution may contain one-fourth or one-sixteenth as many pixels as the first resolution (representing either half as many or one-quarter as many pixels in each of the x- and y-directions). For example, if the received images are 640×480, they may be downsampled to 320×240 or 160×120. In some aspects, other downsampling sizes may also be used. The method may use this downsampling ratio to control the tradeoff between execution time of the method and depth resolution of background objects. In some aspects, the means for downsampling may include a processor.

In some aspects, the first image may be captured by a first camera, and the second image may be captured by a second camera. These two cameras may be located a known distance apart. The two cameras may have an identical native resolution to each other. For example, the cameras may be identical to each other generally (the same make and model of camera or camera component, for example). In some aspects, the means for capturing an image may include a digital camera.

At block 1020, the method includes generating a depth map at the second resolution based on global minimization techniques, using the downsampled first reference image and the downsampled second reference image. For example, a number of different global techniques may be used to generate a depth map. These techniques, generally, may use the entire image and may attempt to minimize an energy component to create the depth map. These methods may be run iteratively, such that each iteration creates a larger version of the depth map. Accordingly, generating a depth map may include using an iterative process on progressively larger images in order to generate a depth map using global minimization. For example, generating a depth map may be done by minimizing an energy function, as described above with regards to Eqn. 1. Generally, execution time may be proportional to the number of pixels an in image. Thus, execution time and memory requirements for low-resolution images may be relatively small. In some aspects, the means for generating a depth map may include a processor.

At block 1030, the method includes upsampling the depth map from the second resolution to the first resolution. For example, this upsampling may be done using bilinear interpolation. The result of such an upsampling will be a depth map that is blurry, and with some aliasing artifacts on the contours of various objects. In some aspects, the means for upsampling may include a processor. In some aspects, the means for using bilinear interpolation may include a processor.

At block 1040, the method uses a guided filter to align contours of the upsampled depth map to contours of the first reference image. For example, this filter may increase the sharpness of the edges of the upsampled depth map based on the edges and contours of the first reference image. In some aspects, this may result in a final depth map which has a high resolution, with accurate depths for foreground objects, crisp edges, and has little or no aliasing artifacts. In some aspects, the means for using a guided filter map include a processor.

Generally, this method may decrease processing resolution compared to the computationally and memory-wise inefficient global methods. This decreases execution time and memory requirements compared to global optimization. Further, this yields an accurate depth map at the lower resolution. Further, the piecewise constancy of disparity maps and availability of high-resolution reference image allows for high-quality interpolation of low-resolution disparity maps. Generally, foreground objects can be segmented at high resolutions with good accuracy. Depth accuracy for distant objects, however, may be compromised. In this method, the processing resolution may be selected to control the tradeoff between performance and final depth map quality.

Figure 11:
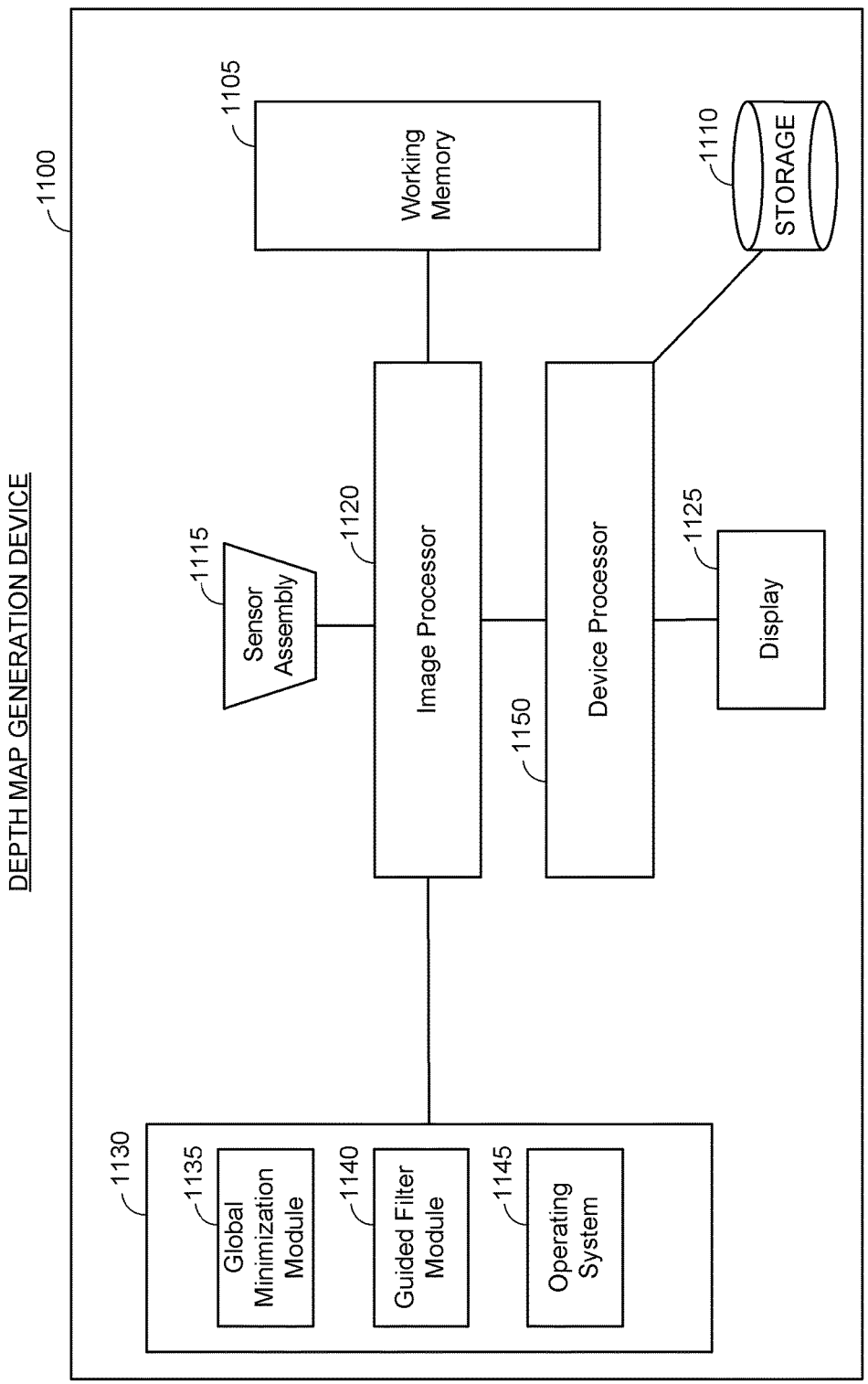
FIG. 11 is a schematic illustrating an example of a depth map generation device, according to some embodiments.

FIG. 11 is a schematic illustrating an example of a depth map generation device, according to some embodiments. Specifically, FIG. 11 depicts a high-level block diagram of a device 1100 having a set of components including an image processor 1120 linked to an image sensor assembly 1115. The image processor 1120 is also in communication with a working memory 1105, memory 1130, and device processor 1150, which in turn is in communication with storage 1110 and electronic display 1125.

In some embodiments, device 1100 may be a sensing device purposely configured for depth sensing. In some embodiments, device 1100 may be a cell phone, digital camera, tablet computer, personal digital assistant, or the like. There are many portable computing devices in which an imaging system such as is described herein would provide advantages. A plurality of applications may be available to the user on device 1100. These applications may include traditional photographic and video applications, high dynamic range imaging, panoramic photo and video, or stereoscopic imaging such as 3D images or 3D video.

The device 1100 includes the image sensor assembly 1115 for capturing external images. The image sensor assembly 1115 may include a sensor, lens assembly, and a primary and secondary reflective or refractive surface for redirecting a portion of a target image to each sensor. The image sensor assembly 1115 may include two or more sensors. The image sensor assembly may be coupled to the image processor 1120. In some aspects, the sensor assembly 1115 may be configured to capture stereo image pairs, where two images are captured of the same scene from different angles at the same time.

The image processor 1120 may be configured to perform various processing operations on received image data comprising N portions of the target image in order to output a high quality stitched image, as will be described in more detail below. Processor 1120 may be a general purpose processing unit or a processor specially designed for imaging applications. Examples of image processing operations include cropping, scaling (e.g., to a different resolution), image stitching, image format conversion, color interpolation, color processing, image filtering (e.g., spatial image filtering), lens artifact or defect correction, etc. Processor 1120 may, in some embodiments, comprise a plurality of processors. Certain embodiments may have a processor dedicated to each image sensor. Processor 1120 may be one or more dedicated image signal processors (ISPs) or a software implementation of a processor.

As shown, the image processor 1120 is connected to a memory 1130 and a working memory 1105. In the illustrated embodiment, the memory 1130 stores global minimization module 1135, guided filter module 1140, and operating system 1145. These modules include instructions that configure the image processor 1120 or device processor 1150 to perform various image processing and device management tasks. Working memory 1105 may be used by image processor 1120 to store a working set of processor instructions contained in the modules of memory 1130. Alternatively, working memory 1105 may also be used by image processor 1120 to store dynamic data created during the operation of device 1100.

As mentioned above, the image processor 1120 is configured by several modules stored in the memories. The global minimization module 1135 may include instructions that configure the image processor 1120 or the device processor 1150 to generate a depth map based on a stereo image pair. This depth map may be generated using a global minimization technique, such as an iterative technique described above. The global minimization module 1135 may also contain instructions for downsampling an image. For example, a number of different downsampled versions of the images making up the stereo image pair may be used to construct depth maps of increasingly large sizes. These downsampled images may be generated by the image processor 1120 or the device processor 1150, using instructions from the global minimization module 1135.

Guided filter module 1140 may comprise instructions that configure the image processor 1120 or the device processor 1150 to use an image, such as one of the reference images, to sharpen the edges of an upscaled depth map. In some aspects, the guided filter module 1140 may further contain instructions for upsampling a depth map, such as through bilinear interpolation. For example, the guided filter module may receive a depth map generated by the global minimization module 1135, and may upsample this depth map to match a resolution of a reference image.

Operating system module 1145 configures the image processor 1120 to manage the working memory 1105 and the processing resources of device 1100. For example, operating system module 1145 may include device drivers to manage hardware resources such as the imaging sensor assembly 1115. Therefore, in some embodiments, instructions contained in the image processing modules discussed above may not interact with these hardware resources directly, but instead interact through standard subroutines or APIs located in operating system component 1170. Instructions within operating system 1145 may then interact directly with these hardware components. Operating system module 1145 may further configure the image processor 1120 to share information with device processor 1150.

Device processor 1150 may be configured to control the display 1125 to display the captured image, or a preview of the captured image, to a user. The display 1125 may be external to the imaging device 1100 or may be part of the imaging device 1100. The display 1125 may also be configured to provide a view finder displaying a preview image for a use prior to capturing an image, or may be configured to display a captured image stored in memory or recently captured by the user. The display 1125 may comprise an LCD or LED screen, and may implement touch sensitive technologies.

Device processor 1150 may write data to storage module 1110, for example data representing captured images. While storage module 1110 is represented graphically as a traditional disk device, those with skill in the art would understand that the storage module 1110 may be configured as any storage media device. For example, the storage module 1110 may include a disk drive, such as a floppy disk drive, hard disk drive, optical disk drive or magneto-optical disk drive, or a solid state memory such as a FLASH memory, RAM, ROM, and/or EEPROM. The storage module 1110 can also include multiple memory units, and any one of the memory units may be configured to be within the image capture device 1100, or may be external to the image capture device 1100. For example, the storage module 1110 may include a ROM memory containing system program instructions stored within the image capture device 1100. The storage module 1110 may also include memory cards or high speed memories configured to store captured images which may be removable from the camera.

Although FIG. 11 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 11 illustrates two memory components, including memory component 1130 comprising several modules and a separate memory 1105 comprising a working memory, one with skill in the art would recognize several embodiments utilizing different memory architectures. For example, a design may utilize ROM or static RAM memory for the storage of processor instructions implementing the modules contained in memory 1130. The processor instructions may be loaded into RAM to facilitate execution by the image processor 1120. For example, working memory 1105 may comprise RAM memory, with instructions loaded into working memory 1105 before execution by the processor 1120.

Accordingly, in one aspect of the present disclosure, a method of generating a high-resolution image containing depth information of an object is disclosed. The method includes generating a reduced resolution first image from a reference first image and generating a reduced resolution second image from a reference second image, the reference first image and the reference second image being a stereo image pair. For example, two high-resolution reference images in a stereo pair may be used, and lower-resolution versions of those images may be generated. The method further includes determining a set of conjugate pairs of points in the first and second reduced resolution images and generating a depth map, having the resolution of the first and second reduced resolution images, based at least in part on the conjugate pairs of points. The method further includes upsampling the depth map to the resolution of the reference first image to generate a high resolution depth map, the upsampling including interpolating data in the depth map to generate depth data of the high resolution depth map, and modifying the depth data of the high resolution depth map to conform with edges of the reference first image or the reference second image.

Implementing Systems and Terminology

Implementations disclosed herein provide systems, methods and apparatus for multiple aperture array cameras free from parallax and tilt artifacts. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, and a memory including instructions or modules for carrying out the CNR process discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method of generating a high-resolution image containing depth information of an object, the method comprising:
    downsampling a first reference image at a first resolution to iteratively form a number of smaller first reference images at progressively smaller resolutions;
    downsampling a second reference image at the first resolution to iteratively form a number of smaller second reference images at progressively smaller resolutions, wherein the first reference image and the second reference image are a stereo image pair, and wherein the downsampling of the first and second reference images form a stereo pair of smaller images at each downsampled resolution;
    generating a depth map using the smallest downsampled first reference and second reference images;
    iteratively upsampling the depth map forming progressively higher resolution depth maps using a global minimization technique for a number of iterations of upsampling to form an upsampled depth map, the resolution of each iterative depth map corresponding to one of the resolutions of the downsampled first and second reference images forming a stereo pair, wherein the number of iterations of upsampling is determined based on an execution time for forming the progressively higher resolution depth maps being less than a threshold execution time, wherein the execution time for forming the progressively higher resolution depth maps is proportional to a number of pixels in the depth maps, and wherein the number of iterations is at least two;
    upsampling the upsampled depth map by interpolation without using a global minimization technique to create a depth map at the first resolution; and
    aligning contours of the depth map at the first resolution to edges of the first reference image.

2. The method of claim 1, wherein iteratively upsampling the depth map using a global minimization technique comprises minimizing an energy function between the stereo pair of first and second reference images corresponding to the resolution of the depth map.

3. The method of claim 1, wherein the first reference image and the second reference image are captured simultaneously by cameras which are a known distance from each other.

4. The method of claim 1, wherein upsampling the upsampled depth map by interpolation is done without using global minimization.

5. The method of claim 1, wherein the depth map is iteratively upsampled three times forming progressively higher resolution depth maps using a global minimization technique.

6. The method of claim 1, wherein the depth map is iteratively upsampled two times forming progressively higher resolution depth maps using a global minimization technique.

7. The method of claim 1, wherein upsampling the upsampled depth map by interpolation is iteratively performed twice to create a depth map at the first resolution.

8. The method of claim 1, wherein upsampling the upsampled depth map by interpolation is iteratively performed once to create a depth map at the first resolution.

9. A device for generating a high-resolution image containing depth information of an object comprising:
    a processor configured to:
        downsample a first reference image at a first resolution to iteratively form a number of smaller first reference images at progressively smaller resolutions;
        downsample a second reference image at the first resolution to iteratively form a number of smaller second reference images at progressively smaller resolutions, wherein the first reference image and the second reference image are a stereo image pair, and wherein the downsampled first and second reference images form a stereo pair of smaller images at each downsampled resolution;
        generate a depth map using the smallest downsampled first reference and second reference images;
        iteratively upsample the depth map forming progressively higher resolution depth maps using a global minimization technique for a number of iterations to form an upsampled depth map, the resolution of each iterative depth map corresponding to one of the resolutions of the downsampled first and second reference images forming a stereo pair, wherein the number of iterations of upsampling is determined based on an execution time for forming the progressively higher resolution depth maps being less than a threshold execution time, wherein the execution time for forming the progressively higher resolution depth maps is proportional to a number of pixels in the depth maps, and wherein the number of iterations is at least two;
upsample the upsampled depth map by interpolation without using a global minimization technique to create a depth map at the first resolution; and
align contours of the depth map at the first resolution to edges of the first reference image.

10. The device of claim 9, wherein iteratively upsampling the depth map using a global minimization technique comprises minimizing an energy function between the stereo pair of first and second reference images corresponding to the resolution of the depth map.

11. The device of claim 9, wherein the processor is configured to upsample the depth map by interpolation without using global minimization.

12. The device of claim 9, wherein the processor is configured to iteratively upsample the depth map three times forming progressively higher resolution depth maps using a global minimization technique.

13. The device of claim 9, wherein the processor is configured to iteratively upsample the depth map two times forming progressively higher resolution depth maps using a global minimization technique.

14. The device of claim 9, wherein the processor is configured to iteratively upsample the upsampled depth map by interpolation twice to create a depth map at the first resolution.

15. A device for generating a high-resolution image containing depth information of an object comprising:
means for downsampling a first reference image at a first resolution to iteratively form a number of smaller first reference images at progressively smaller resolutions;
means for downsampling a second reference image at the first resolution to iteratively form a number of smaller second reference images at progressively smaller resolutions, wherein the first reference image and the second reference image are a stereo image pair, and wherein the downsampling of the first and second reference images form a stereo pair of smaller images at each downsampled resolution;
means for generating a depth map using the smallest downsampled first reference and second reference images;
means for iteratively upsampling the depth map forming progressively higher resolution depth maps using a global minimization technique for a number of iterations of upsampling to form an upsampled depth map, the resolution of each iterative depth map corresponding to one of the resolutions of the downsampled first and second reference images forming a stereo pair, wherein the number of iterations of upsampling is determined based on an execution time for forming the progressively higher resolution depth maps being less than a threshold execution time, wherein the execution time for forming the progressively higher resolution depth maps is proportional to a number of pixels in the depth maps, and wherein the number of iterations is at least two;
means for upsampling the upsampled depth map by interpolation without using a global minimization technique to create a depth map at the first resolution; and
means for aligning contours of the depth map at the first resolution to edges of the first reference image.

16. The device of claim 15, wherein iteratively upsampling the depth map using a global minimization technique comprises generating a depth map by minimizing an energy function between the stereo pair of first and second reference images corresponding to the resolution of the depth map.

17. The device of claim 15, wherein upsampling the upsampled depth map by interpolation is done without using global minimization.

18. The device of claim 15, wherein the depth map is iteratively upsampled three times forming progressively higher resolution depth maps using a global minimization technique.

19. The device of claim 15, wherein the depth map is iteratively upsampled two times forming progressively higher resolution depth maps using a global minimization technique.

20. The device of claim 15, wherein upsampling the upsampled depth map by interpolation is iteratively performed twice to create a depth map at the first resolution.

21. The device of claim 15, wherein upsampling the upsampled depth map by interpolation is iteratively performed once to create a depth map at the first resolution.

22. A non-transitory computer-readable medium comprising code that, when executed, causes an apparatus to:
downsample a first reference image at a first resolution to iteratively form a number of smaller first reference images at progressively smaller resolutions;
downsample a second reference image at the first resolution to iteratively form a number of smaller second reference images at progressively smaller resolutions, wherein the first reference image and the second reference image are a stereo image pair, and wherein the downsampled first and second reference images form a stereo pair of smaller images at each downsampled resolution;
generate a depth map using the smallest downsampled first reference and second reference images;
iteratively upsample the depth map forming progressively higher resolution depth maps using a global minimization technique for a number of iterations to form an upsampled depth map, the resolution of each iterative depth map corresponding to one of the resolutions of the downsampled first and second reference images forming a stereo pair, wherein the number of iterations of upsampling is determined based on an execution time for forming the progressively higher resolution depth maps being less than a threshold execution time, wherein the execution time for forming the progressively higher resolution depth maps is proportional to a number of pixels in the depth maps, and wherein the number of iterations is at least two;
upsample the upsampled depth map by interpolation without using a global minimization technique to create a depth map at the first resolution; and
align contours of the depth map at the first resolution to edges of the first reference image.

23. The non-transitory computer-readable medium of claim 22, wherein iteratively upsampling the depth map using a global minimization technique comprises minimizing an energy function between the stereo pair of first and second reference images corresponding to the resolution of the depth map.

24. The non-transitory computer-readable medium of claim 22, wherein the first reference image and the second reference image are captured simultaneously by cameras which are a known distance from each other.

25. The non-transitory computer-readable medium of claim 22, further comprising code that, when executed, causes the apparatus to upsample the upsampled depth map by interpolation without using global minimization.

26. The non-transitory computer-readable medium of claim 22, further comprising code that, when executed, causes the apparatus to iteratively upsample the depth map three times forming progressively higher resolution depth maps using a global minimization technique.

27. The non-transitory computer-readable medium of claim 22, further comprising code that, when executed, causes the apparatus to iteratively upsample the depth map two times forming progressively higher resolution depth maps using a global minimization technique.

28. The non-transitory computer-readable medium of claim 22, further comprising code that, when executed, causes the apparatus to iteratively upsample the upsampled depth map by interpolation twice to create a depth map at the first resolution.

29. The non-transitory computer-readable medium of claim 22, further comprising code that, when executed, causes the apparatus to upsample the upsampled depth map by interpolation once to create a depth map at the first resolution.

* * * * *